(12) United States Patent
Shiozawa et al.

(10) Patent No.: US 6,628,439 B2
(45) Date of Patent: *Sep. 30, 2003

(54) GENUINENESS DETECTING SYSTEM AND METHOD FOR USING GENUINENESS DETECTING FILM

(75) Inventors: Akihito Shiozawa, Yokohama (JP); Shinichiro Suzuki, Yokohama (JP); Suzushi Nishimura, Yokohama (JP); Hidekazu Hoshino, Yokohama (JP); Itsuo Takeuchi, Yokohama (JP); Mikihiko Sakakibara, Tokyo-To (JP); Masumi Yokoyama, Tokyo-To (JP)

(73) Assignees: Nippon Mitsubishi Oil Corporation (JP); NHK Spring Ltd. (JP); Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/530,238

(22) PCT Filed: Aug. 27, 1999

(86) PCT No.: PCT/JP99/04641

§ 371 (c)(1),
(2), (4) Date: Apr. 27, 2000

(87) PCT Pub. No.: WO00/13065

PCT Pub. Date: Mar. 9, 2000

(65) Prior Publication Data

US 2002/0051264 A1 May 2, 2002

(30) Foreign Application Priority Data

Aug. 27, 1998 (JP) .......................................... 10-241869

(51) Int. Cl.[7] .......................... G03H 1/00; G02B 5/18; B42D 15/00; G06K 9/74

(52) U.S. Cl. .............................. 359/2; 359/572; 283/86; 356/71

(58) Field of Search ............................ 359/1, 2, 576, 359/572; 283/86, 90, 87; 356/71; 250/556; 235/457, 487

(56) References Cited

U.S. PATENT DOCUMENTS

| | | | | |
|---|---|---|---|---|
| 4,514,085 A | * | 4/1985 | Kaye | 356/71 |
| 4,536,014 A | * | 8/1985 | Boutaleb et al. | 283/83 |
| 5,200,794 A | * | 4/1993 | Nishiguma et al. | 356/71 |
| 5,347,111 A | * | 9/1994 | Hoshino | 359/2 |
| 5,497,227 A | * | 3/1996 | Takeuchi et al. | 359/2 |
| 6,005,691 A | * | 12/1999 | Grot et al. | 359/2 |
| 6,061,122 A | * | 5/2000 | Hoshino et al. | 356/71 |

FOREIGN PATENT DOCUMENTS

| | | | |
|---|---|---|---|
| EP | 0 911 7578 A2 | * | 4/1999 |
| JP | 6-138803 | | 5/1994 |
| JP | 11-151877 | | 6/1999 |
| WO | WO 99/53349 | * | 10/1999 |

* cited by examiner

*Primary Examiner*—Audrey Chang
(74) *Attorney, Agent, or Firm*—Parkhurst & Wendel, L.L.P.

(57) ABSTRACT

An authenticity identifying film (10) has a reflective film (11) having a circularly polarized light selectivity to reflect at least only either of right-handed circularly polarized light and left-handed circularly polarized light of incident light to produce reflected light. The reflective film (11) is provided with a hologram forming part (11a). The hologram forming part (11a) reflects circularly polarized light of the same circular polarization as that of the reflected light in a direction different from that of the reflected light to form a holographic image. The reflected light reflected by the reflective film (11) and the holographic image formed by the hologram forming part (11a) are detected by detectors disposed at different positions, respectively.

25 Claims, 6 Drawing Sheets

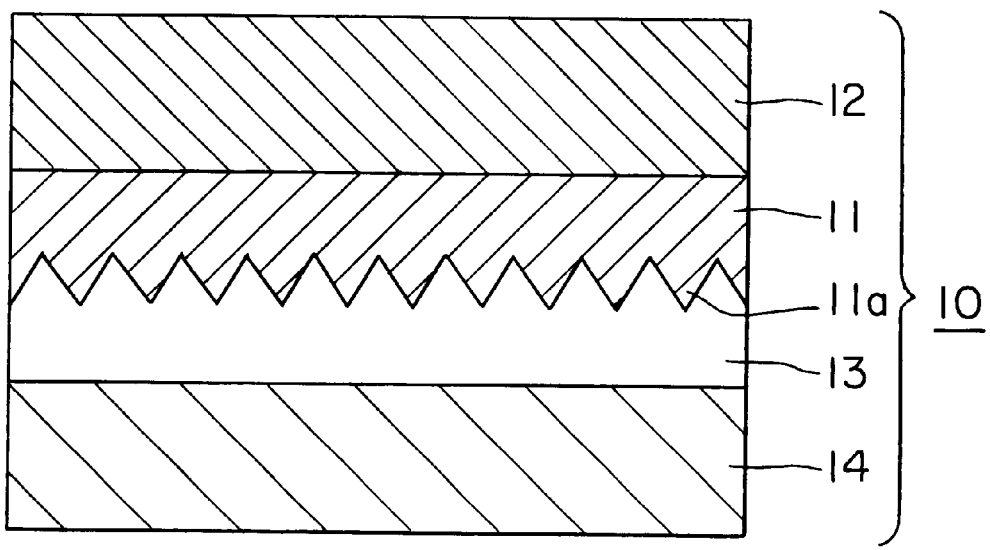
F I G. 1
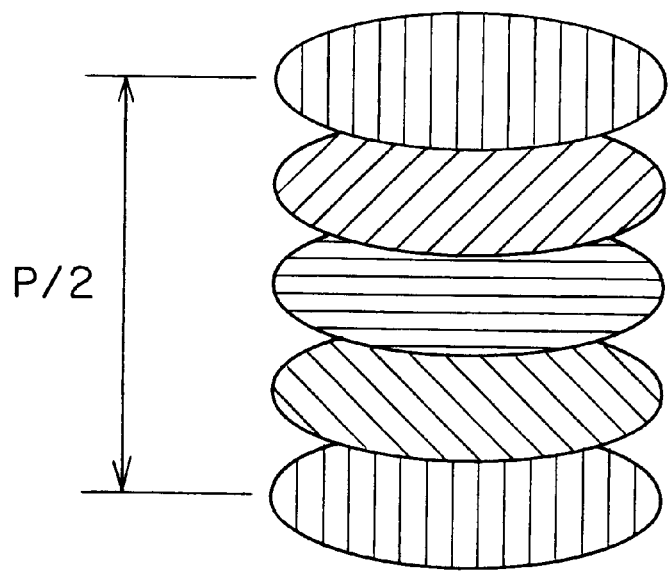
F I G. 2

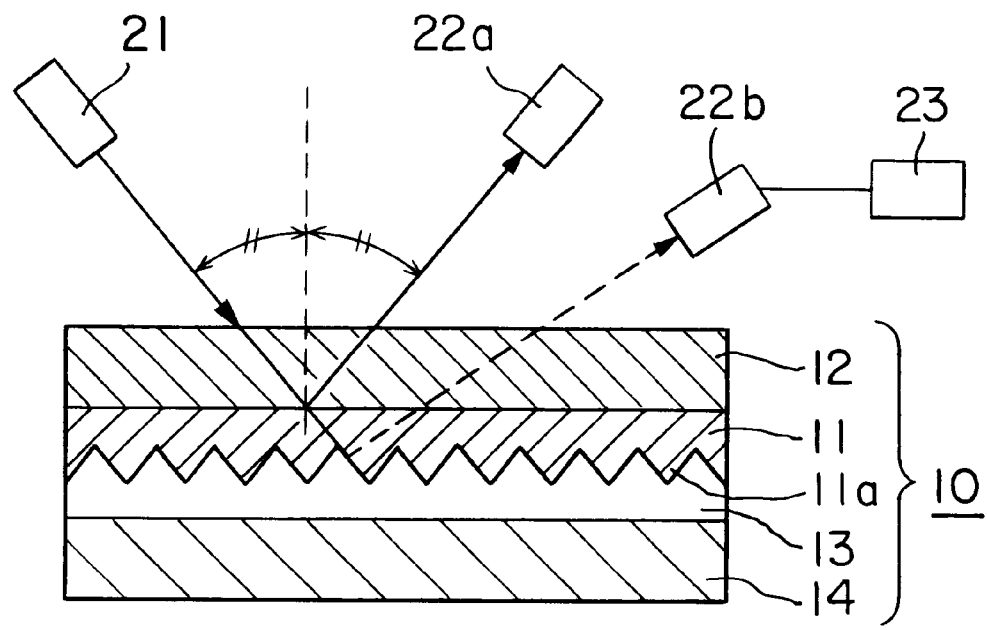
F I G. 4(A)
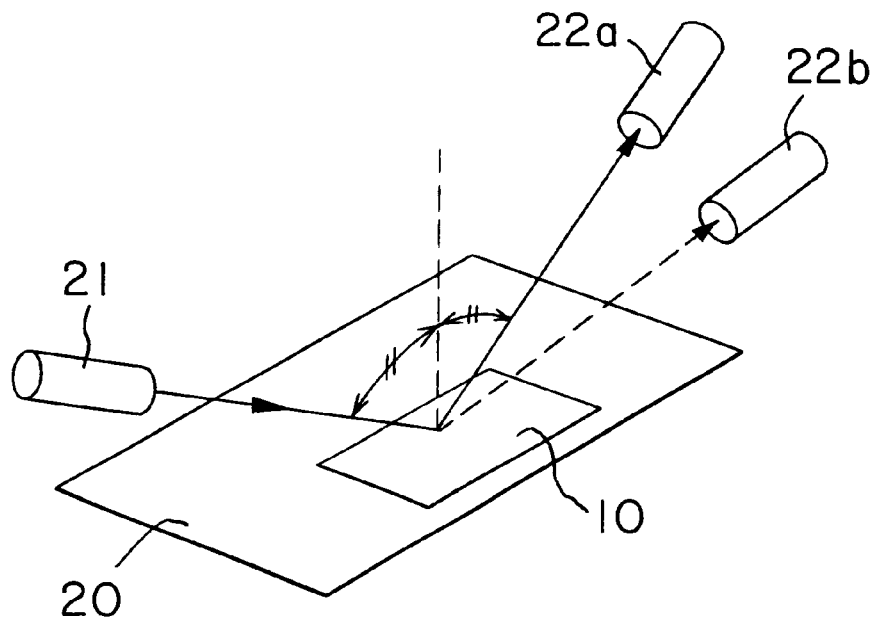
F I G. 4(B)

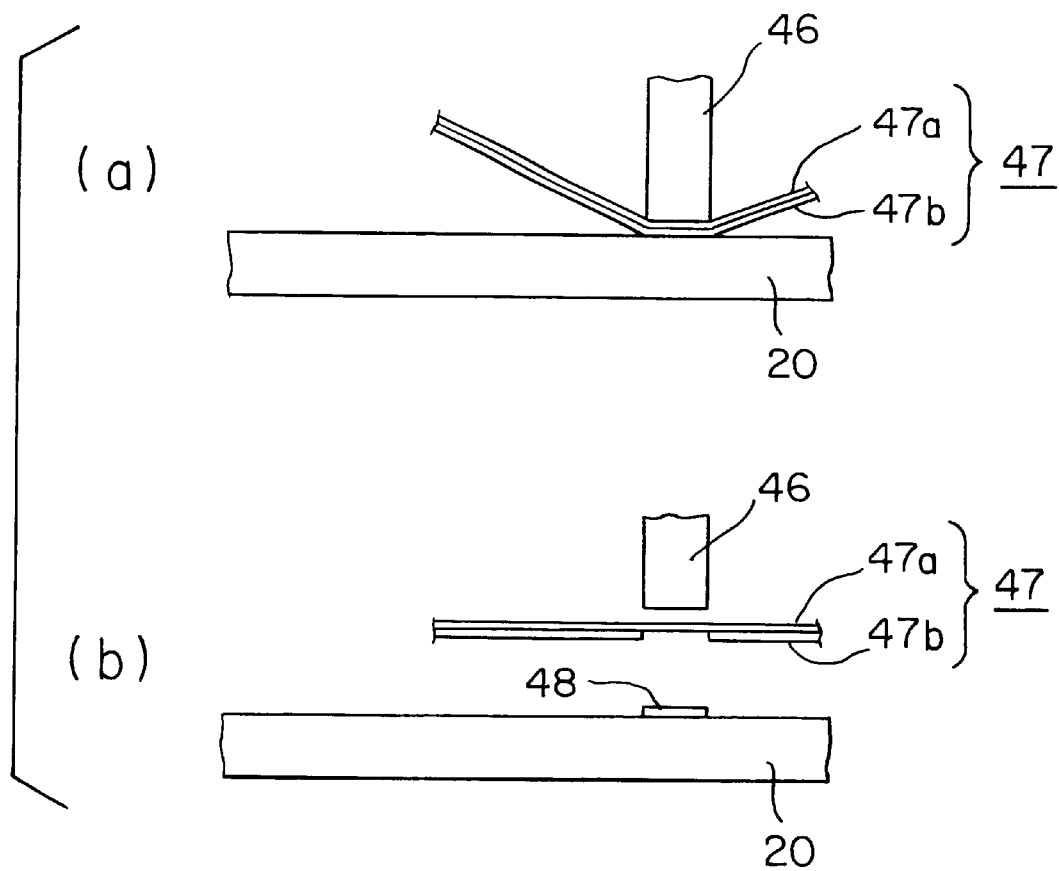
F I G. 11
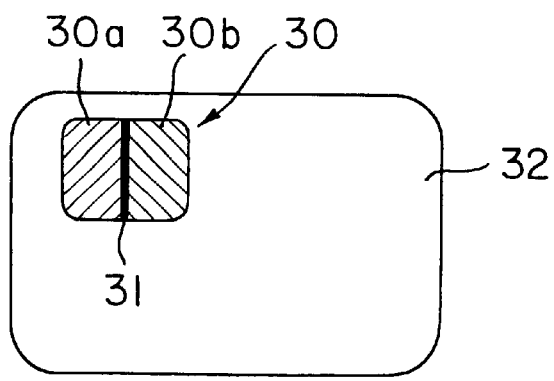
F I G. 12

GENUINENESS DETECTING SYSTEM AND METHOD FOR USING GENUINENESS DETECTING FILM

TECHNICAL FIELD

The present invention relates to an authenticity identifying film and authenticity identifying system for preventing the forgery of articles including cards, gift certificates, currency notes, tickets, bank notes, securities, betting tickets and the like, and a method of using the authenticity identification film.

BACKGROUND ART

A conventional method of preventing the forgery of credit cards, deeds, currency notes and the like attaches an authenticity identifying medium which is difficult to forge to an article to be protected from forgery, and identifies the authenticity identifying medium visually or mechanically. A hologram or a liquid crystal film is used as the authenticity identifying medium.

Holograms include those carrying a holographic image of characters and patterns for visual identification, those carrying a holographic image of numerical codes and special patterns for mechanical recognition, and those carrying both the foregoing holographic images. The hologram has been prevalently used because the hologram cannot be copied by an ordinary color copying machine or the like and is effective in forgery prevention, the hologram is attractive because of its highly aesthetic design, the hologram is difficult to produce and hence the hologram has been prevalently used.

Previously proposed methods employing liquid crystal films includes a method proposed in JP-A No. Sho 63-51193 using a cholesteric liquid crystal which looks in different colors when seen from different directions, and a method proposed in JP-A No. Hei 8-43804 using an optically anisotropic nematic liquid crystal. The method using a cholesteric liquid crystal is able to record two characteristics of the cholesteric liquid crystal, namely, selective reflectivity and circular polarization selectivity, as information for authenticity identification on a single medium, mass-production of a cholesteric liquid crystal of fixed properties is difficult and hence this method is excellent in forgery preventing effect.

However, recently prevalent hologram producing techniques have made possible the production of counterfeits of conventional holograms, which reduced the forgery preventing effect of the conventional holograms.

Although the forging of liquid crystal films is difficult, the mass production of authentic liquid crystal films also is difficult, and hence liquid crystal films have not been prevalently used as authenticity identification mediums.

DISCLOSURE OF THE INVENTION

It is an object of the present invention to provide an authenticity identifying film having a highly esthetic design, difficult to forge and facilitating either visual or mechanical authenticity identification, an authenticity identifying system and a method of using the authenticity identifying film.

An authenticity identifying film according to the present invention includes a reflective film having a circularly polarized light selectivity to reflect only either of right-handed circularly polarized light or left-handed circularly polarized light of at least incident light to produce reflected light, wherein the reflective film is provided with a hologram forming part that reflects circularly polarized light of the same circular polarization as that of the reflected light in a direction different from that of the reflected light to form a holographic image.

An authenticity identifying film according to the present invention includes a reflective film having a circularly polarized light selectivity to reflect only either of right-handed circularly polarized light or left-handed circularly polarized light of at least incident light to produce reflected light, and a hologram forming layer laminated to the reflective film having a hologram forming part that reflects circularly polarized light of circular polarization opposite that of the reflected light in a direction different from that of the reflected light to form a holographic image.

The authenticity identifying film according to the present invention is characterized in that the reflective film is a liquid crystal film.

The authenticity identifying film according to the present invention is characterized in that the reflective film has a fixed cholesteric phase.

The authenticity identifying film according to the present invention is characterized in that the hologram forming part includes an embossed hologram.

The authenticity identifying film according to the present invention may further include an adhesive layer to be attached to an article.

The authenticity identifying film according to the present invention is characterized in that the reflective film is delaminated when the authenticity identifying film is separated from an article.

The authenticity identifying film according to the present invention may further include a protective film covering a surface of the reflective film opposite a surface of the same facing an article.

The authenticity identifying film according to the present invention may further include a base film attached by an additional adhesive layer to a surface of the reflective film opposite a surface of the same facing an article.

The authenticity identifying film according to the present invention may further include a light absorbing layer interposed between the reflective film and the adhesive layer.

An article with an authenticity identifying film according to the present invention comprises: an authenticity identifying film including a reflective film having a circularly polarized light selectivity to reflect only either of right-handed circularly polarized light or left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film having a circularly polarized light selectivity to reflect only either of right-handed circularly polarized light or left-handed circularly polarized light of at least incident light to produce reflected light, and a hologram forming layer laminated to the reflective film, having a hologram forming part that reflects circularly polarized light of circular polarization opposite that of the reflected light in a direction different from that of the reflected light to form a holographic image; an article to which the authenticity identifying film is bonded; and a photograph interposed between the article and the authenticity identifying film.

An authenticity identifying system according to the present invention comprises: an authenticity identifying film including a reflective film having a circularly polarized light selectivity to reflect only either of right-handed circularly polarized light or left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film having a circularly polarized light selectivity to reflect only either of right-handed circularly polarized light or left-handed circularly polarized light of at least incident light to produce reflected light, and a hologram forming layer laminated to the reflective film, having a hologram forming part that reflects circularly polarized light of circular polarization opposite that of the reflected light in a direction different from that of the reflected light to form a holographic image; a light source unit that irradiates the authenticity identifying film with light; and a detecting unit for detecting reflected light from the authenticity identifying film and the holographic image.

In the authenticity identifying system according to the present invention, the detecting unit is capable of detecting only light in a predetermined waveband.

In the authenticity identifying system according to the present invention, the detecting unit is capable of measuring the intensity of transmitted light.

In the authenticity identifying system according to the present invention, at least either the light source unit or the detecting unit is provided with a polarizing plate, a phase plate or a band-pass filter.

According to the present invention, a method of using an authenticity identifying film including a reflective film having a circularly polarized light selectivity to reflect only either of right-handed circularly polarized light or left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film having a circularly polarized light selectivity to reflect only either of right-handed circularly polarized light or left-handed circularly polarized light of at least incident light to produce reflected light, and a hologram forming layer laminated to the reflective film, having a hologram forming part that reflects circularly polarized light of circular polarization opposite that of the reflected light in a direction different from that of the reflected light to form a holographic image, the method comprising the steps of: irradiating the authenticity identifying film with right-handed circularly polarized light or left-handed circularly polarized light; and deciding that the authenticity identifying film is authentic when either of right-handed circularly polarized light and left-handed circularly polarized light can be detected and the other circularly polarized light cannot be detected.

According to the present invention, a method of using an authenticity identifying film including a reflective film having a circularly polarized light selectivity to reflect only either of right-handed circularly polarized light and left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film having a circularly polarized light selectivity to reflect only either of right-handed circularly polarized light and left-handed circularly polarized light of at least incident light to produce reflected light, and a hologram forming layer laminated to the reflective film, having a hologram forming part that reflects circularly polarized light of circular polarization opposite that of the reflected light in a direction different from that of the reflected light to form a holographic image, the method comprising the steps of: irradiating the authenticity identifying film with light including right-handed circularly polarized light and left-handed circularly polarized light; and deciding that the authenticity identifying film is authentic when the holographic image from the authenticity identifying film can be read from the authenticity identifying film in a direction different from that of the reflected light.

According to the present invention, a method of using an authenticity identifying film including a reflective film having a circularly polarized light selectivity to reflect only either of right-handed circularly polarized light and left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film laminated to the reflective film, having a circularly polarized light selectivity to reflect only either of right-handed circularly polarized light and left-handed circularly polarized light of at least incident light to produce reflected light, and a hologram forming layer having a hologram forming part that reflects circularly polarized light of circular polarization opposite that of the reflected light in a direction different from that of the reflected light to form a holographic image and laminated to the reflective film, the method comprising the steps of: irradiating the authenticity identifying film with light including right-handed circularly polarized light and left-handed circularly polarized light; and deciding that the authenticity identifying film is authentic when the film has a part that cannot be visually recognized when the authenticity identifying film is observed visually through an examining tool that transmits only either of right-handed circularly polarized light and left-handed circularly polarized light.

According to the present invention, a method of using an authenticity identifying film including a reflective film having a circularly polarized light selectivity to reflect only either of right-handed circularly polarized light and left-handed circularly polarized light of at least incident light to produce reflected light, the reflective film being provided with a hologram forming part that reflects circularly polarized light of the same circular polarization as that of the reflected light in a direction different from that of the reflected light to form a holographic image, or an authenticity identifying film including a reflective film having a circularly polarized light selectivity to reflect only either of right-handed circularly polarized light and left-handed circularly polarized light of at least incident light to produce reflected light, and a hologram forming layer laminated to the reflecting film, having a hologram forming part that reflects circularly polarized light of circular polarization opposite that of the reflected light in a direction different from that of the reflected light to form a holographic image, the method comprising the steps of: irradiating the authenticity identifying film with light including right-handed circularly polarized light and left-handed circularly polarized light; and measuring the light intensity difference between the intensities of right-handed circularly polarized light and that of the intensity of left-handed circularly polarized light transmitted by an examining tool that transmits only either of right-handed circularly polarized light and left-handed circularly polarized light and deciding whether or not the authenticity identifying film is authentic on the basis of the light intensity difference.

BRIEF DESCRIPTION OF THE DRAWINGS

FIG. 1 is a typical sectional view of an authenticity identifying film in an embodiment 1-1 according to the present invention;

FIG. 2 is a typical view of a cholesteric liquid crystal contained in an authenticity identifying film according to the present invention;

FIGS. 4(A) and 4(B) are views of assistance in explaining an authenticity identifying system employing an authenticity identifying film according to the present invention;

FIG. 11 is a view of assistance in explaining a method of applying an authenticity identifying film in an embodiment 2-3 according to the present invention to an article; and FIG. 12 is a plan view of an article in an embodiment 2-4 according to the present invention to be subjected to authenticity identification and a circularly polarizing plate.

BEST MODE FOR CARRYING OUT THE INVENTION

First Embodiment

Figure 3:
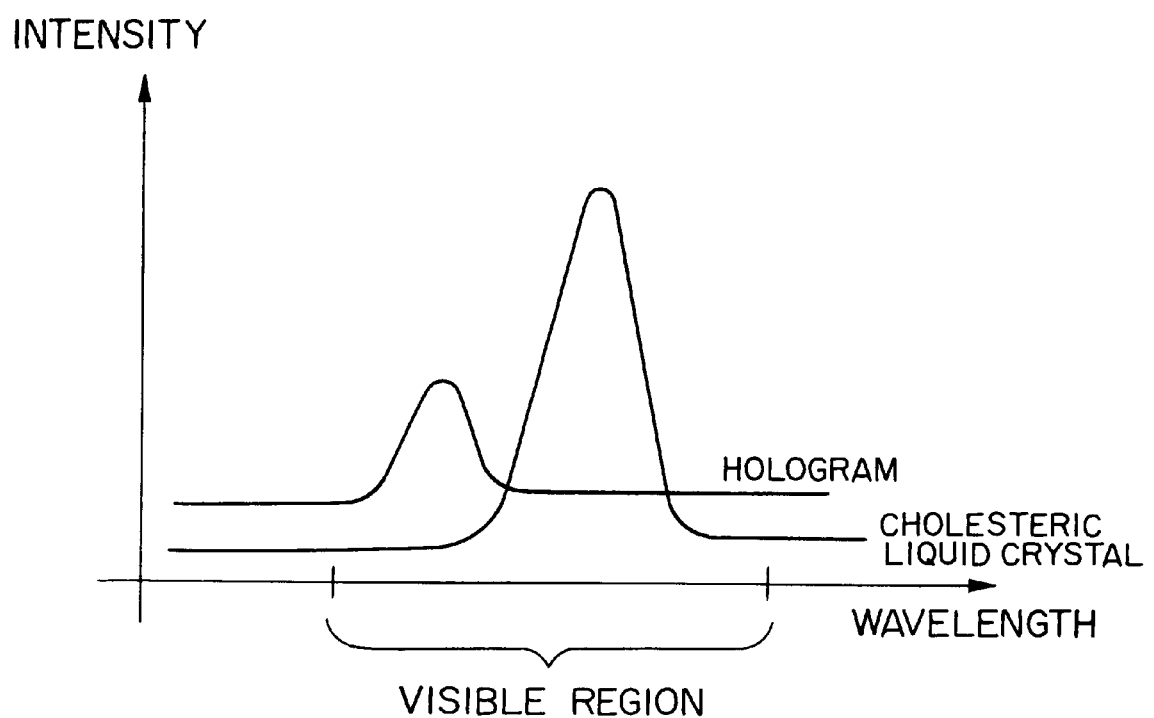
FIG. 3 is a graph showing, by way of example, an intensity-wavelength characteristic of reflected light reflected by an authenticity identifying film according to the present invention.

Preferred embodiments of the present invention will be described hereinafter.

Embodiment 1-1

FIG. 1 is a sectional view of an authenticity identifying film in an embodiment 1-1 according to the present invention.

An authenticity identifying film 10 has a reflective film 11, a protective layer 12, a light absorbing layer 13 and a base film 14.

The reflective film 11 reflects only either of right-handed circularly polarized light and left-handed circularly polarized light of incident light to produce reflected light. A hologram forming part 11a is formed in one of the surfaces of the reflective film 11. The hologram forming part 11a reflects light of the same circular polarization as that of the reflected light reflected by the reflective film 11 in a direction different from that of the reflected light to form a holographic image. The reflective film 11 reflects only either of right-handed circularly polarized light and left-handed circularly polarized light on its surface contiguous with the protective layer 12 or in the reflective film 11 to produce reflected light. Light of the same circular polarization as that of the reflected light reaches the hologram forming part 11a and is reflected on the hologram forming part 11a in a direction different from that of the reflected light by the hologram forming part 11a to form a holographic image.

The reflective film 11 has a cholesteric liquid crystal phase. The mean screw axis orientation of the cholesteric liquid crystal phase is parallel to the thickness of the film. Cholesteric liquid crystal will be described later.

The reflective film 11 may be any one of mediums having optical selective reflectivity and circularly polarized light selectivity, such as polymer films formed through the fixation of cholesteric liquid crystal orientation and films formed by dispersing a cholesteric liquid crystal in mediums. A polymer film formed through the fixation of liquid crystal orientation is particularly suitable.

A possible polymer film is formed by orienting a low molecular-weight liquid crystal in a cholesteric orientation and fixing the cholesteric orientation by cross-linking the low molecular-weight liquid crystal by a photoreaction or a thermal reaction. Another possible polymer film is formed by cholesteric-orienting a side chain type or main chain type thermotropic high-molecular liquid crystal in a liquid crystal state, cooling the oriented thermotropic chain-molecular liquid crystal at a temperature not higher than the transition point to fix the oriented state of the liquid crystal. A third possible polymer film is formed by cholesteric-orienting a side chain type or a main chain type lyotroic high-molecular liquid crystal in a solution and fixing the orientated state by gradually removing the solvent.

High-molecular liquid crystals suitable for forming such films are side chain type polymers having liquid crystal forming groups on side chains, such as polyacrylates, polymethacrylates, polysiloxanes and polymalonates, and main chain type polymers having liquid crystal forming groups on main chains, such as polyesters, polyester amides, polycarbonates, polyamides and polyimides.

The hologram forming part 11a is formed by embossing one surface of the reflective film 11 with minute irregularities with a master hologram embossing die to transfer a pattern formed on the master hologram embossing die to the surface. When embossing the surface of the reflective film 11, heat and pressure is applied to the reflective film 11 by a press, a rolling mill, a calender, a laminator or a stamper. Another method applies a cholesteric liquid crystal to a master hologram die in a cholesteric liquid crystal layer and orients the cholesteric liquid crystal on the master hologram die. The hologram forming part 11a reflects light in a direction different from that of reflected light reflected by the reflective film 11 to form a holographic image.

The protective layer 12 protects the reflective film 11. Suitable materials for forming the protective layer 12 are acrylic resins, urethane resins, epoxy resins, silicone resins, EVA resins, polyamide resins, polyester resins, polystyrene resins, cellulose resins and mixtures of some of those resins. Materials of the protective layer 12 are not limited to the foregoing resins. It is desirable to determine a material for forming the protective layer 12 selectively taking into consideration required properties of the surface of the authenticity identifying film 10 including smoothness, hardness and abrasion resistance.

The light absorbing layer 13 absorbs light penetrating through the reflective film 11. The light absorbing layer 13 may be formed of, for example, a black ink. Since the light absorbing layer 13 absorbs the light penetrating through the reflective film 11, undesirable reflection of transmitted light can be prevented, which facilitates the visual recognition of the holographic image.

From the view point of aesthetic design, the light absorbing layer 13 may be a color layer formed of a color ink or the like and capable of absorbing light in a specific waveband of the light penetrated the reflective film 11.

The base film 14 is provides the authenticity identifying film 10 with a self-supporting ability. The material of the base film 14 may be determined according to a purpose of the authenticity identifying film 10 and there is no particular restriction on the material of the base film 14. Particularly preferable materials for forming the base film 14 are polycarbonates, polyvinyl alcohols, polysulfones, polyethylenes, polypropylenes, polystyrenes, polyarylates, polyethylene terephthalates, triacetyl cellulose, diacetyl cellulose, and poly(ethylene-co-vinyl alcohol). The base film 14 may be a film of a mixture of one of the foregoing material and a high-molecular liquid crystal.

FIG. 2 is a typical view of a cholesteric liquid crystal contained in an authenticity identifying film according to the present invention, and FIG. 3 is a graph showing, by way of example, an intensity-wavelength characteristic of reflected light reflected by an authenticity identifying film according to the present invention.

Explanation of Cholesteric Liquid Crystal

A cholesteric liquid crystal has elongated molecules parallel to each other within the plane of a layer, but the direction of orientation is twisted slightly from layer to layer in the direction of thickness of the film to form a helix through the layers as shown in FIG. 2. When the pitch P (thickness necessary for liquid crystal molecules turn through 360°) and the wavelength λ of the incident light is substantially equal to each other, the cholesteric liquid crystal exercises two optical properties, namely, a selective reflectivity and circular polarization selectivity (Reference literature: Ekishyou to Disupurei Oyou no Kiso, Corona).

Selective refractivity is a property to reflect light in a specific waveband more strongly than light of a wavelength in other waveband (FIG. 3). Since the selective reflectivity is exhibited for a specific waveband, the reflected light has a chromatic color of a high color purity when a cholesteric liquid crystal having a proper pitch P is selected. The center wavelength of the waveband λs and the bandwidth Δλ are expressed by Expressions (1) and (2).

$$\lambda s = nm \cdot P \quad (1)$$

$$\Delta \lambda = \Delta n \cdot P / nm \quad (2)$$

where nm $(=\sqrt{(no^2+ne^2)/2})$, ne is extraordinary ray reflective index in a plane in an optical medium, no is ordinary reflective index and Δn=ne−no.

The center wavelength λs and the bandwidth Δλ expressed by Expressions (1) and (2) are defined for vertical incidence of light on the cholesteric liquid crystal layer (0°-incidence, on-axis incidence). If the incident light falls obliquely on the cholesteric liquid crystal layer (off-axis incidence), the pitch P decreases apparently and, consequently, the center wavelength λs shifts toward the shorter-wavelength side and the bandwidth Δλ decreases. This phenomenon is called blue shift because the center wavelength λs shifts toward the shorter-wavelength side. The shift of the center wavelength λs is dependent on the incident angle and is readily distinguishable by visual observation. For example, reflected light from the cholesteric liquid crystal is red when the cholesteric liquid crystal is observed in a direction perpendicular to the surface (direction of 0°-incidence). As the observation angle to a perpendicular to the surface increases, the observed color of the reflected light changes from red, through orange, yellow, green, bluish green to blue.

The circular polarization selectivity is a property that transmits circularly polarized light having a displacement vector that rotates in a specific direction and reflects circularly polarized light having a displacement vector that rotates in a direction opposite the specific direction. Circularly polarized light included in the incident light and polarized in the same direction as that of twisting of elongated molecules of the cholesteric liquid crystal is reflected and the rotating direction of the reflected light becomes the same. Circularly polarized light included in the incident light and polarized in a direction opposite the direction of twisting of elongated molecules of the cholesteric liquid crystal is transmitted. These are the unique properties of the cholesteric liquid crystal. A right-handed cholesteric liquid crystal reflects a right-handed circularly polarized light component and transmits a left-handed polarized light component. The reflected light is right-handed polarized light.

Explanation of Hologram

A hologram is a desired pattern, an image or characters formed by changing the grading constant and the diffraction direction of a diffraction grating formed on an article in a small region corresponding to a pixel size. Holograms are classified by construction into volume holograms and plane holograms, or by light modulating system into amplitude holograms and phase holograms. Modulation plane holograms (embossed holograms) which can be mass-produced by a microreplica process are used widely in industries. To form a sharp holographic image in the visible region, the grating constant of the diffraction grating must be very precisely controlled so as to fall in the range of about 10 μm to about 100 nm. Therefore, the fabrication of a master die and the manufacture of replicas require proficient processing techniques.

As shown in FIG. 3, the hologram reflects light of a wavelength in a specific waveband strongly, authenticity identification can be achieved through the observation of the wavelength of the reflected light.

Using Method

FIGS. 4(A) and 4(B) are views of assistance in explaining an authenticity identifying system employing the authenticity identifying film according to the present invention. FIG. 4(A) is a typical sectional view of the authenticity identifying film and FIG. 4(B) is a perspective view of the authenticity identifying film.

The authenticity identifying film 10 is attached to an article 20, i.e., a subject of authenticity identification, with an adhesive layer 45 (FIG. 7) by a thermal transfer method, a sealing method, a thread method or a thermal transfer ribbon method. The article 20 is, for example, a plastic card, such as a credit card, a banking card or an ID card, a security, such as a gift certificate, a currency note, a gift check or a stock certificate, a PET card, such as a prepaid card or a commuter ticket, tickets, a bank note, a passport or a betting ticket, which, however is not restrictive.

When the twisting direction of the cholesteric liquid crystal phase of the reflective film 11 is a right-hand direction (counterclockwise direction) and a light source 21 emits natural light, a detector 22a disposed so as to receive regularly reflected light reflected in a direction indicated by the arrow followed by a solid line receives right-handed circularly polarized light of reflected light reflected by the reflective film 11. In FIG. 4(A), the right-handed circularly polarized light is shown, for convenience, as if the same is reflected only by the surface of the reflective film 11 contiguous with the protective layer 12 to produce reflected light. Actually, the reflected light includes right-handed polarized light reflected by the interior of the reflective film 11.

A detector 22b disposed so as to receive reflected light reflected in the direction of the arrow followed by a broken line is able to detect a holographic image formed by light component reflected and diffracted by the hologram forming part 11a formed in the other surface of the reflective film 11. The light reflected by the hologram forming part 11a right-handed circularly polarized light component, which is the same as the reflected light. If a circularly polarizing plate or a combination of a linearly polarizing plate and a phase film is incorporated into the detector 22a to distinguish the rotating direction of circularly polarized light, light is transmitted by a right-handed circularly polarizing plate and the same can be detected, and light is absorbed by a left-handed circularly polarizing plate and the same cannot be detected. Thus, the reflected light can be readily recognized if the same is right-handed polarized light. Since an ordinary reflector does not have circularly polarized light selectivity, the reflected light can be detected by using either of a right-handed circularly polarizing plate and a left-handed circularly polarizing plate. According to the present invention, the authenticity of the authenticity identifying film 10 can be easily distinguished by an authenticity identifying system shown in FIGS. 4(A) and 4(B).

A band-pass filter for distinguishing the color of circularly polarized light may be incorporated into the light source unit 21 or a band-pass filter or a spectroscopic system for distinguishing the color of circularly polarized light may be incorporated into the detector 22a to distinguish the wavelength selectivity of the reflective film 11. When the wavelength selectivity of the reflective film 11 can be thus distinguished, it is possible to distinguish easily the authenticity of the authenticity identifying film 10 by examining the reflected light to see whether or not the reflected light has a wavelength in a desired waveband. Electrooptic detection also is possible.

The hologram forming part 11a of the reflective film 11 may be provided with a ciphered authenticity identifying code represented by the direction of diffraction or the wavelength of diffracted light. The authenticity of the authenticity identifying film 10 can be easily distinguished by receiving a holographic image formed by the hologram forming part 11a by the detector 22b and distinguishing the authenticity of the holographic image by an authenticity distinguishing decoder 23 combined with the detector 22b.

Authenticity can be more exactly distinguished by emitting circularly polarized light by the light source unit 21. When right-handed circularly polarized light is emitted by the light source unit 21, cholesteric reflection can be observed by the detector 22a disposed so as to receive regularly reflected light and a holographic image can be observed by the detector 22b disposed at a position displaced from the passage of the regularly reflected light. When left-handed circularly polarized light is emitted by the light source unit 21, no reflected light is produced, any holographic image is not formed and only the color of the light absorbing layer 13 can be observed.

Thus, the authenticity identifying system may be provided, in addition to the light source unit 21 and the detectors 22a and 22b, with the circularly polarizing plate, the linearly polarizing plate, the phase plate, the band-pass filter, the spectroscopic system and the authenticity identifying decoder 23 to distinguish the rotating direction of the circularly polarized light included in the reflected light and the reflection waveband and to decode the authenticity identifying code represented by the holographic image. When the authenticity identifying system is provided with those additional components, the authenticity of the authenticity identifying film 10 can be more accurately distinguished. Electrooptic detection also is possible.

Since the reflective film 11 employed in this embodiment has the cholesteric liquid crystal phase, the reflected light from the reflective film 11 is the circularly polarized light. Therefore, the authenticity of the authenticity identifying film 10 can be easily distinguished by detecting the reflected light by the detector 22a provided with the circularly polarizing plate. Since the reflected light has a wavelength in a specific waveband, the authenticity of the authenticity identifying film 10 can be easily distinguished through visual observation, and the authenticity can be more accurately distinguished by mechanical reading.

Since the reflective film 11 is provided with the hologram forming part 11a in one surface thereof, the authenticity of the authenticity identifying film 10 can be easily distinguished by detecting a holographic image formed by diffracted light reflected by the hologram forming part 11a at a reflection angle other than the regular reflection angle by the detector 22b.

Embodiment 1-2

Figure 5:
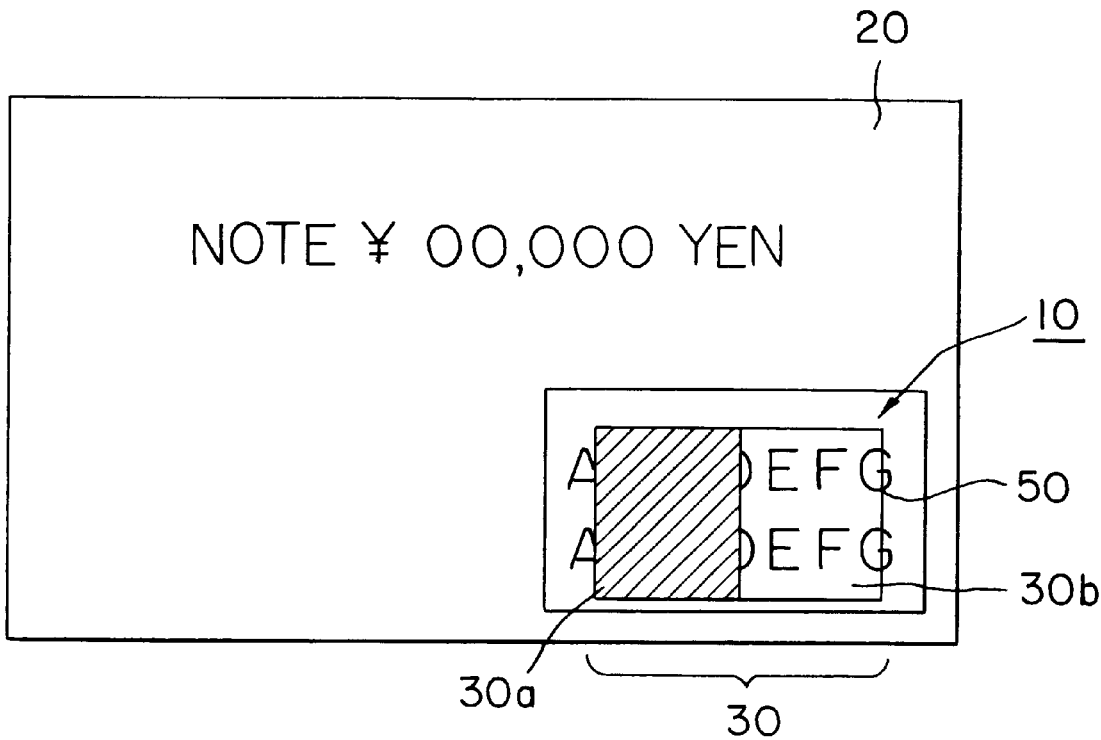
FIG. 5 is a view of assistance in explaining a method of using an authenticity identifying film in an embodiment 1-2 according to the present invention.

FIG. 5 is a view of assistance in explaining a method of using an authenticity identifying film in an embodiment 1-2 according to the present invention.

In the following description of the embodiment 1-2, parts functionally similar to those previously mentioned in the description of the embodiment 1-1 are designated by the same reference characters and the description thereof will be omitted to avoid duplication.

FIG. 5 shows an article 20 to which an authenticity identifying film 10 provided with a hologram forming part 11a that forms a hologram of characters, pictures, patterns or the like.

When the article 20 is irradiated with natural light (nonpolarized light), reflected light from a part of the article to which the authenticity identifying film 10 is attached is circularly polarized light. When the twisting direction of the cholesteric liquid crystal phase of the reflective film 11 is a right-hand direction (counterclockwise direction), the reflected light reflected by the reflective film 11 and a holographic image are right-handed circularly polarized light. When the reflected light and the holographic image are observed through a circularly polarizing plate 30 having a left-hand circularly polarizing part 30a that transmits left-handed circularly polarized light, and a right-hand circularly polarizing part 30b disposed contiguously with the left-hand circularly polarizing part 30a, transmitting right-handed circularly polarized light, the selectively reflected light reflected by the authenticity identifying film 10 and the holographic image can be clearly observed through the right-hand circularly polarizing part 30b as if there is no polarizing plate, the left-hand circularly polarizing part 30a becomes dark and neither the reflected light or the holographic image can be observed through the left-hand circularly polarizing part 30a. Therefore, it is readily known that the reflected light is right-handed circularly polarized light and the holographic image is formed of right-handed circularly polarized light.

If the authenticity identifying film attached to the article is a counterfeit, the reflected light is not circularly polarized light nor can the holographic image formed of circularly polarized light be formed. Accordingly, when the authenticity identifying film 10 is observed through the circularly polarizing plate 30, the same selectively reflected light and the same holographic image can be seen through the left-hand circularly polarizing part 30a and the right-hand circularly polarizing part 30b.

The embodiment 1-2 is able to distinguish authenticity easily by using the circularly polarizing plate 30.

Authenticity distinguishment can be more accurately achieved by the electrooptical measurement of the difference or the ratio in the intensity of transmitted light between the left-hand circularly polarizing part 30a and the right-hand circularly polarizing part 30b than by the visual observation of the authenticity identifying film 10. The accuracy of authenticity distinguishment can be further improved by the measurement of the wavelength of the detected reflected light.

Embodiment 1-3

Figure 6:
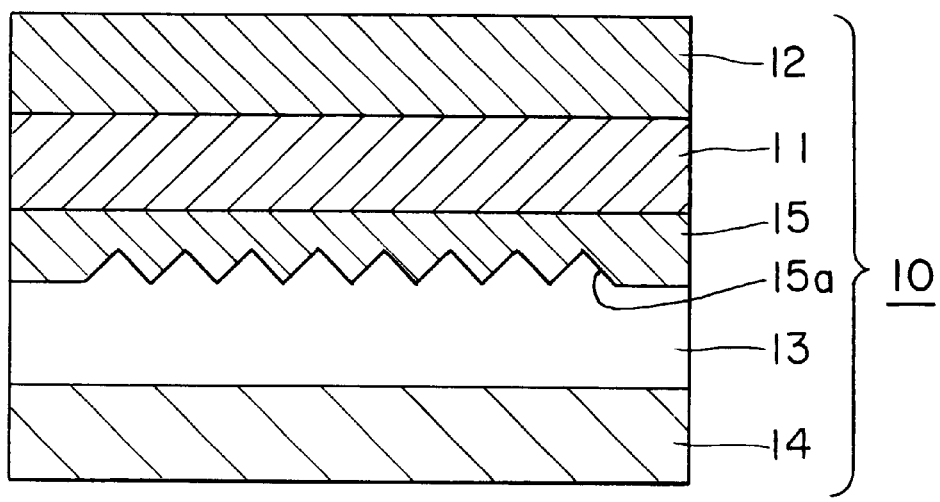
FIG. 6 is a typical sectional view of assistance in explaining a method of using an authenticity identifying film in an embodiment 1-3 according to the present invention.

FIG. 6 is a typical sectional view of assistance in explaining a method of using an authenticity identifying film in an embodiment 1-3 according to the present invention.

An authenticity identifying film 10 has a reflective film 11, a protective layer 12, a light absorbing layer 13, a base film 14 and a hologram forming layer 15.

In this embodiment, both the surfaces of the reflective film 11 are smooth, which is different from the reflective films employed in the embodiments 1-1 and 1-2.

The hologram forming layer 15 is laminated to the reflective film 11 to reflect light penetrating through the reflective film 11 in a direction different from that of the reflected light from the reflective film 11 to form a holographic image. One surface of the hologram forming layer 15 is provided with a hologram forming part 15a. The reflective film 11 reflects either of right-handed circularly polarized light or left-handed circularly polarized light. The hologram forming layer 15 transmits circularly polarized light of one hand of polarization opposite the other hand of polarization of the reflected light reflected by the reflective film 11, and the hologram forming part 15a reflects the light transmitting through the reflective film 11 to form a holographic image. The hologram forming layer 15 is formed of a synthetic resin that facilitate forming minute irregularities in the hologram forming layer 15. Synthetic resins suitable for forming the hologram forming layer 15 are thermoplastic synthetic resins including polyvinyl chlorides, acrylic resins, polycarbonates and polystyrenes, thermosetting synthetic resins including unsaturated polyester resins, melamine resins and epoxy resins, and mixtures each of a thermoplastic synthetic resin and a thermosetting synthetic resin. The hologram forming layer 15 of such a resin is bonded to the reflective film 11. The hologram forming layer 15 may be formed by applying a solution of such a resin or a molten resin to the surface of the reflective film 11. The hologram forming layer 15 may be formed on a transparent film by applying a solution or a molten resin to the transparent film, and the transparent film carrying the hologram forming layer 15 may be attached to the surface of the reflective film 11.

The authenticity of the authenticity identifying film 10 in this embodiment also can be easily distinguished.

Since the reflective film 11 and the hologram forming layer 15 are separate components, the reflective film 11 and the hologram forming layer 15 can be easily formed by separate processes, respectively.

Since the reflective film 11 and the hologram forming layer 15 can be separately manufactured, different kinds of authenticity identifying films 10 can be manufactured by combining one kind of all-purpose reflective film 11 and hologram forming layers 15 respectively having hologram forming parts 15a of different patterns.

Modifications

The present invention is not limited in its practical application to the foregoing embodiments 1-1, 1-2 and 1-3, and many changes and modifications are possible.

For example, the hologram forming parts 11a and 15a may be provided with a plurality of fine irregular sections, each having grooves extended in different directions, respectively. Such a hologram forming part reflects reflected light in a plurality of directions and hence authenticity distinguishing accuracy can be improved by the detection of the reflected light reflected in different directions.

Although the twisting direction of the elongated molecules of the cholesteric liquid crystal phase of the reflective films in the embodiments 1-1, 1-2 and 1-3 is right-handed, the same may be left-handed for the same effects.

The hologram forming layers 11a and 15a may be provided with a deposited film to form a sharp holographic image.

Although the hologram forming part 11a is formed in a surface of the reflective film 11 contiguous with the light absorbing layer 13 in FIG. 1, the hologram forming part 11a may be formed in the surface contiguous with the protective layer 12. In such a case, light incident on the authenticity identifying film 10 is reflected by the hologram forming part 11a in a predetermined direction to form a holographic image, and the light penetrating into the reflective film 11 is reflected in a direction different from that of the reflected light reflected by the hologram forming part 11a. Thus, the effect of this authenticity identifying film is the same as that of the authenticity identifying film 10 shown in FIG. 1.

If the reflective film 11 is sufficiently hard, the protective layer 12 may be omitted.

If an article to which the authenticity identifying film 10 is attached has a light absorbing property, the light absorbing layer 13 may be omitted.

If the reflective film 11, the protective layer 12 or the light absorbing layer 13 has a sufficient self-supporting ability or the authenticity identifying film 10 need not have self-supporting ability, the authenticity identifying film 10 need not be necessarily provided with the base film 14.

As is apparent from the foregoing description, according to the present invention, the reflective film provided with the hologram forming part is difficult to forge and facilitates the identification of authenticity.

The reflective film and the hologram forming layer attached to the reflective film or sandwiched between the adjacent surfaces can be manufactured by separate processes, respectively.

Since the reflective film is a liquid crystal film. the same has a selective reflectivity and a circularly polarized light selectivity.

Since the reflective film is formed by fixing a cholesteric phase, the reflective film has a selective reflectivity and a circularly polarized selectivity.

The hologram forming part having an embossed hologram can be easily formed.

The light source unit for illuminating the authenticity identifying film and the detector for detecting the rotating direction of the circular polarized light facilitates authenticity identification.

The detector that detects only the light of a wavelength in a predetermined waveband simplifies authenticity identification.

The detector that detects the intensity of transmitted light enables accurate authenticity identification.

The light source unit and/or the detector having the polarizing plate, the phase plate and or the band-pass filter can be easily manufactured.

When the reflected light produced by reflecting right-handed circularly polarized light and left-handed circularly polarized light is detected, it is decided that the authenticity identifying film is authentic when only either of the reflected light of the right-handed circularly polarized light or that of the left-handed circularly polarized light can be detected, so that authenticity can be easily distinguished.

When the reflected light produced by reflecting light including right-handed circularly polarized light and left-handed circularly polarized light is detected, it is decided that the authenticity identifying film is a counterfeit when only the reflected light reflected in one direction can be detected and it is decided that the authenticity identifying film is authentic when the reflected light reflected in the different direction and the holographic image can be detected. Therefore, authenticity can be easily distinguished.

When the authenticity identifying film is observed visually through an examining tool that transmits only either of right-handed circularly polarized light or left-handed circularly polarized light, it is decided that the authenticity identifying film is authentic. Thus, authenticity can be easily distinguished.

When light intensity difference is measured electrooptically by using a measuring tool that transmits only either of right-handed circularly polarized light or left-handed circularly polarized light, it is decided whether or not the authenticity identifying film is authentic on the basis of the light intensity difference. Thus, authenticity can be accurately distinguished.

Second Embodiment

Embodiment 2-1

Figure 7:
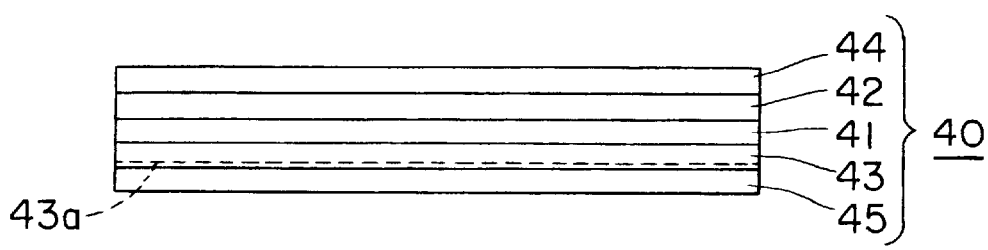
FIG. 7 is a typical sectional view of an authenticity identifying film in an embodiment 2-1 according to the present invention.

An authenticity identifying film in an embodiment 2-1 according to the present invention will be described with reference to FIG. 7. Referring to FIG. 7, an authenticity identifying film 40 has a reflective film 41, a hologram forming layer 43 laminated to the reflective film 41, an adhesive layer 45 formed on the hologram forming layer 43, an additional adhesive layer 42 formed on a surface of the reflective film 41 opposite the surface on which the hologram forming layer 43 is laminated, and a base film 44.

The authenticity identifying film 40 is attached to an article 20 with the adhesive layer 45. The hologram forming layer 43 has a hologram forming part 43a. A hologram forming part may be formed in the reflective film 41 and the hologram forming layer 43 may be omitted.

The authenticity identifying film 40 is of a sealed type or a laminated type. The base film 44 remains on the authenticity identifying film 40 after the authenticity identifying film 40 has been bonded to the article 20.

The authenticity identifying film 40 may be of a hot-stamping type or of a thermal transfer ribbon type. When the authenticity identifying film 40 is of a hot-stamping type or a thermal transfer ribbon type, the base film 44 is removed after the authenticity identifying film 40 has been bonded to the article 20 and hence the authenticity identifying film 40 is provided with a separating layer and a protective layer instead of the additional adhesive layer 42.

The authenticity identifying film 40 may be provided with additional layers other than the foregoing layers.

Embodiment 2-2

An embodiment 2-2 according to the present invention will be described with reference to FIGS. 8 to 10.

Figure 8:
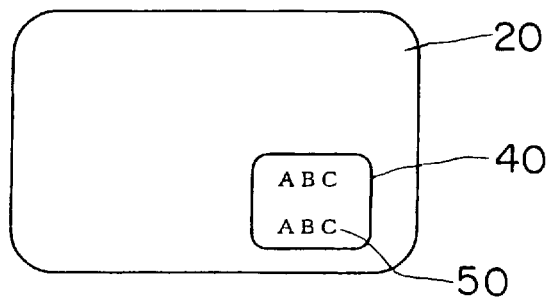
FIG. 8 is a plan view of an authenticity identifying film in an embodiment 2-2 according to the present invention.

Referring to FIG. 8, the authenticity identifying film 40 shown in FIG. 7 is attached to an article 20, such as a plastic card or a banking card, by a hot-stamping process, a sticking process or a thermal transfer process. The surface of the article 20 is coated with, for example, a black light absorbing layer to enable the effective observation of the reflected light reflected by the reflective film 41 and the holographic image formed by the hologram forming layer 43. Characters and a pattern 50 may be formed on the surface of the authenticity identifying film 40.

If an effort is made to separate the authenticity identifying film 40 stuck to the article 20 by a sticking process from the article 20, the reflective film 41 is delaminated because the adhesions between the component layers of the authenticity identifying film 40 and the adhesion between the authenticity identifying film 40 and the article 20 are higher than the strength of the reflective film 41. Thus, the reflective film 41 is delaminated if an effort is made to separate the authenticity identifying film 40 from the article 20 with an intention to manipulate the authenticity identifying film 40 for dishonest alteration and hence dishonest alteration of the authenticity identifying film 40 is impossible.

A modification will be described with reference to FIG. 9. A modification shown in FIG. 9 has the authenticity identifying film 40, the article 20 and a photograph sandwiched between the authenticity identifying film 40 and the article 20. The modification shown in FIG. 9 is the same in other respects as the embodiment shown in FIG. 8. As shown in FIG. 9, the photograph 51 enables the identification of the owner of the article 20. If the authenticity identifying film 40 is separated from the article 20 with an intention replacing the photograph with another one, the reflective film 41 is delaminated.

Figure 9:
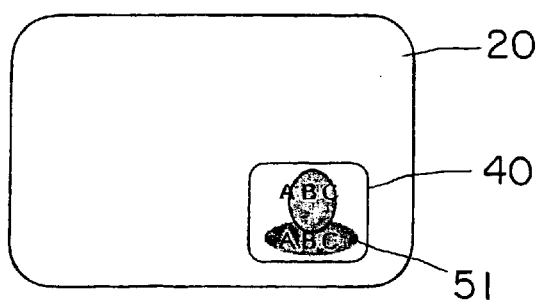
FIG. 9 is a plan view of the authenticity identifying film in the embodiment 2-2.
Figure 10:
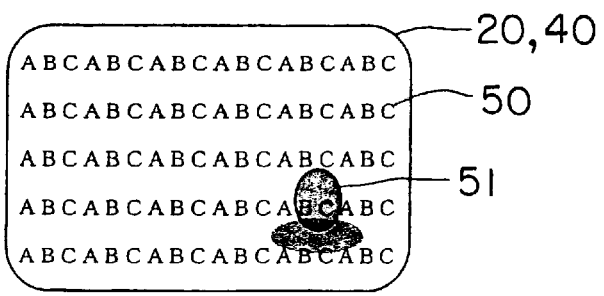
FIG. 10 is a plan view of the authenticity identifying film in the embodiment 2-2.

The authenticity identifying film 40 employed in the modification shown in FIG. 9 is not provided with any light absorbing layer (FIG. 7), the authenticity identifying film 40 is transparent and hence the photograph 51 attached to the article can be surely recognized through the authenticity identifying film 40.

Another modification will be described with reference to FIG. 10. In the modification shown in FIG. 10, characters and patterns 50 are formed over the entire surface of an article 20, and an authenticity identifying film 40 of the same size as the article 20 is laminated to the article 20. The modification shown in FIG. 10 is the same in other respects as that shown in FIG. 9.

Embodiment 2-3

An embodiment 2-3 according to the present invention will be described with reference to FIG. 11. FIG. 11 is a view of assistance in explaining a method of applying an authenticity identifying film 48 to an article 20.

As shown in FIG. 11, a transfer sheet 47 having a base film 47a and a transfer layer 47b is disposed on the article 20, and a hot stamper or a transfer head 46 is lowered from above the transfer sheet 47 (FIG. 11(a)). The hot stamper or the transfer head 46 applies heat and pressure to the transfer sheet 47 to transfer a part of the transfer layer 47b to the article 20. In this manner, an authenticity identifying film 48 is formed on the article 20 by the part of the transfer layer 47b.

The authenticity identifying film 48 has a separating layer and a protective layer 42, a reflective film 41, a hologram forming layer 43 and an adhesive layer 45 (FIG. 7).

Embodiment 2-4

An embodiment 2-4 according to the present invention will be described with reference to FIG. 12. The embodiment shown in FIG. 12 is a card formed by attaching the circularly polarizing plate 30 shown in FIG. 5 to a plastic or paper base 32. The circularly polarizing plate 30 has a left-hand circularly polarizing part 30a, a right-hand circularly polarizing part 30b, and a support part 31 disposed at the boundary between the left-hand circularly polarizing part 30a and the right-hand circularly polarizing part 30b.

Each of the left-hand circularly polarizing part 30a and the right-hand circularly polarizing part 30b is formed by laminating a polarizing film and a phase contrast film. The phase contrast film is on the side of an authenticity identifying film. The directions of the absorption axes of the polarizing films of the left-hand circularly polarizing part 30a and the right-hand circularly polarizing part 30b are perpendicular to each other. The strength of the circularly polarizing plate 30 is maintained by the support part 31.

The circularly polarizing plate 30 has a visual effect as shown in FIG. 5. When the photograph of the embodiments shown in FIGS. 9 and 10 are observed (FIG. 9), the left-hand circularly polarizing part 30a conceals the holographic image and only the photograph can be observed, and the right-hand circularly polarizing part 30b emphasizes the holographic image (FIG. 10).

What is claimed is:

1. An authenticity identifying film comprising:
    a reflective film comprising a liquid crystal film having a cholesteric phase and having a circularly polarized light selectively to reflect only either of right-handed circularly polarized light or left-handed circularly polarized light of incident light to produce reflected light,
    wherein the reflective film is provided with a hologram forming part that reflects circularly polarized light of the same circular polarization as that of the reflected light in a direction different from that of the reflected light to form a holographic image, and
    wherein the reflective film comprises a front surface on the light incidence side and a rear surface on the side opposite to the light incidence side, and the front surface of the reflective film is a flat surface and the hologram forming part is provided on the rear surface of the reflective film causing the thickness of the reflective film to vary due to the thickness variation of the hologram forming part.

2. The authenticity identifying film according to claim 1, wherein
    the hologram forming part includes an embossed hologram.

3. The authenticity identifying film according to claim 1 further comprising:
    an adhesive layer to be attached to an article.

4. The authenticity identifying film according to claim 3, wherein
    the reflective film is destroyed when the authenticity identifying film is separated from the article.

5. The authenticity identifying film according to claim 3 further comprising:
    a protective film covering a surface of the reflective film opposite a surface of the reflective film facing an article.

6. The authenticity identifying film according to claim 3 further comprising:
    a base film attached by an additional adhesive layer to a surface of the reflective film opposite a surface of the reflective film facing the article.

7. The authenticity identifying film according to claim 3 further comprising:
    a light absorbing layer interposed between the reflective film and the adhesive layer.

8. An authenticity identifying film comprising:
    a reflective film comprising a liquid crystal film having a cholesteric phase and having a circularly polarized light selectively to reflect only either of right-handed circularly polarized light or left-handed circularly polarized light of incident light to produce reflected light;
    a hologram forming layer laminated to the reflective film, having a hologram forming part that reflects circularly polarized light of the opposite circular polarization to that of the reflected light in a direction different from that of the reflected light to form a holographic image, and
    wherein the reflective film comprises a front surface on the light incidence side and a rear surface on the side opposite to the light incidence side, and both the front surface and the rear surface of the reflective film are flat surfaces, the holographic forming layer having a front surface and a rear surface being laminated on the rear surface of the reflective film, the front surface of the hologram forming layer being a flat surface, and the hologram forming part being provided on the rear surface of the hologram forming layer.

9. An article with an authenticity identifying film comprising:
    an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to form a holographic image, the reflective film comprising a front surface on the light incidence side and a rear surface on the side opposite to the light incidence side, the front surface of the reflective film being a flat surface, and the hologram forming part being provided on the rear surface of the reflective film causing the thickness of the reflective film to vary due to the thickness variation of the hologram forming part;
    an article to which the authenticity identifying film is bonded; and
    a photograph interposed between the article and the authenticity identifying film.

10. An authenticity identifying system comprising:
    an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to form a holographic image, the reflective film comprising a front surface on the light incidence side and a rear surface on the side opposite to the light incidence side, the front surface of the reflective film being a flat surface, and the hologram forming part being provided on the rear surface of the reflective film;
    a light source unit for irradiating the authenticity identifying film with light; and
    a detecting unit for detecting the reflected light from the authenticity identifying film and the holographic forming part causing the thickness of the reflective film to vary due to the thickness variation of the hologram forming part.

11. The authenticity identifying system according to claim 10, wherein
the detecting unit is capable of detecting only light in a predetermined waveband.

12. The authenticity identifying system according to claim 10, wherein
the detecting unit is capable of measuring the intensity of transmitted light by the detecting unit.

13. The authenticity identifying system according to claim 10, wherein
at least either the light source unit or the detecting unit is provided with a polarizing plate.

14. The authenticity identifying system according to claim 10, wherein
at least either the light source unit or the detecting unit is provided with a phase plate.

15. The authenticity identifying system according to claim 10, wherein
at least either the light source unit or the detecting unit is provided with a band-pass filter.

16. A method of using an authenticity identifying film comprising a reflective film comprising a liquid crystal film having a cholesteric phase and having a circularly polarized light selectively to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to from a holographic image, the reflective film comprising a front surface on the light incidence side and a rear surface on the side opposite to the light incidence side, the front surface of the reflective film being a flat surface, and the hologram forming part being provided on the rear surface of the reflective film causing the thickness of the reflective film to vary due to the thickness variation of the hologram forming part;
said method comprising the steps of:
irradiating the authenticity identifying film with right-handed circularly polarized light and left-handed circularly polarized light respectively; and
deciding that the authenticity identifying film is authentic when either right-handed circularly polarized light or left-handed circularly polarized light, which is reflected from the reflective film, can be detected and the other circularly polarized light, which is not reflected from the reflective film, cannot be detected.

17. A method of using an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to form a holographic image, the reflective film comprising a front surface on the light incidence side and a rear surface on the side opposite to the light incidence side, the front surface of the reflective film being a flat surface, and the hologram forming part being provided on the rear surface of the reflective film causing the thickness of the reflective film to vary due to the thickness variation of the hologram forming part;
said method comprising the steps of:
irradiating the authenticity identifying film with light including right-handed circularly polarized light and left-handed circularly polarized light; and
deciding that the authenticity identifying film is authentic when the holographic image from the authenticity identifying film can be read in a direction different from that of the reflected light.

18. A method of using an authenticity identifying film comprising a reflective film comprising a liquid crystal film having a cholesteric phase and having a circularly polarized light selectively to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to form a holographic image, the reflective film comprising a flat surface on the light incidence side and a rear surface on the side opposite to the light incidence side, the front surface on the reflective film being a flat surface, and the hologram forming part being provided on the rear surface of the reflective film causing the thickness of the reflective film to vary due to the thickness variation of the hologram forming part;
said method comprising the steps of:
irradiating the authenticity identifying film with light including right-handed circularly polarized light and left-handed circularly polarized light; and
deciding that the authenticity identifying film is authentic when the film has a part that cannot be visually recognized when the authenticity identifying film is observed visually through an examining tool having region that transmits of right-handed circularly polarized light and region transmits left-handed circularly polarized light.

19. A method of using an authenticity identifying film comprising a liquid crystal film having a cholesteric phase and having a circularly polarized light selectivity to reflect only either of right-handed circularly polarized light or left-handed circularly polarized light of incident light to produce reflected light, the reflective film being provided with a hologram forming part that reflects circularly polarized light of the same circular polarization as that of the reflected light in a direction different from that of the reflected light to form a holographic image, the reflective film comprising a flat surface on the light incidence side and a rear surface on the side opposite to the light incidence side, the front surface on the reflective film being a flat surface, and the hologram forming part being provided on the rear surface of the reflective film causing the thickness of the reflective film to vary due to the thickness variation of the hologram forming part;
said method comprising the steps of:
irradiating the authenticity identifying film with light including right-handed circularly polarized light and left-handed circularly polarized light;
measuring a light intensity difference between intensities of right-handed circularly polarized light and that of left-handed circularly polarized light transmitted by an examining tool having region that transmits of right-handed circularly polarized light and region transmits left-handed circularly polarized light; and
deciding whether or not the authenticity identifying film is authentic on the basis of the light intensity difference.

20. An article with an authenticity identifying film comprising:
   an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective film, having a hologram forming part that reflects circularly polarized light of the opposite circular polarization to that of the reflected light in a direction different from that of the reflected light to form a holographic image, the reflective film comprising a front surface on the light incidence side and a rear surface on the side opposite to the light incidence side, both the front surface and the rear surface of the reflective film being flat surfaces, and the hologram forming layer having a front surface and a rear surface being laminated on the rear surface of the reflective film, the front surface of the hologram forming layer being a flat surface and the hologram forming part being provided on the rear surface of the hologram forming layer;
   an article to which the authenticity identifying film is bonded; and
   a photograph interposed between the article and the authenticity identifying film.

21. An authenticity identifying system comprising:
   an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective film, having a hologram forming part that reflects circularly polarized light of the opposite circular polarization to that of the reflected light in a direction different from that of the reflected light to form a holographic image, the reflective film comprising a front surface on the light incidence side and a rear surface on the side opposite to the light incidence side, both the front surface and the rear surface of the reflective film being flat surfaces, and the hologram forming layer having a front surface and a rear surface being laminated on the rear surface of the reflective film, the front surface of the hologram forming layer being a flat surface, and the hologram forming part being provided on the rear surface of the hologram forming layer;
   a light source unit for irradiating the authenticity identifying film with light; and
   a detecting unit for detecting the reflected light from the authenticity identifying film and the holographic image causing the thickness of the reflective film to vary due to the thickness variation of the hologram forming part.

22. A method of using an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective film, having a hologram forming part that reflects circularly polarized light of circular polarization opposite that of the reflected light in a direction different from that of the reflected light to form a holographic image, the reflective film comprising a front surface on the light incidence side and a rear surface on the side opposite to the light incidence side, both the front surface and the rear surface of the reflective film being flat surfaces, and the hologram forming layer having a front surface and a rear surface being laminated on the rear surface of the reflective film, the front surface of the hologram forming layer being a flat surface, and the hologram forming part being provided on the rear surface of the hologram forming layer;
   said method comprising the steps of:
      irradiating the authenticity identifying film with right-handed circularly polarized light and left-handed circularly polarized light respectively; and
      deciding that the authenticity identifying film is authentic when either right-handed circularly polarized light or left-handed circularly polarized light, which is reflected from the reflective film, can be detected and the other circularly polarized light, which is not reflected from the reflective film, cannot be detected.

23. A method of using an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective film, having a hologram forming part that reflects circularly polarized light of circular polarization opposite that of the reflected light in a direction different from that of the reflected light to form a holographic image, the reflective film comprising a front surface on the light incidence side and a rear surface on the side opposite to the light incidence side, both the front surface and the rear surface of the reflective film being flat surfaces, and the hologram forming layer having a front surface and a rear surface being laminated on the rear surface of the reflective film,
   the front surface of the hologram forming layer being a flat surface, and the hologram forming part being provided on the rear surface of the hologram forming layer;
   said method comprising the steps of:
      irradiating the authenticity identifying film with light including right-handed circularly polarized light and left-handed circularly polarized light; and
      deciding that the authenticity identifying film is authentic when the holographic image from the authenticity identifying film can be read in a direction different from that of the reflected light.

24. A method of using an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective film, having a hologram forming part that reflects circularly polarized light of circular polarization opposite that of the reflected light in a direction different from that of the reflected light to form a holographic image, the reflective film comprising a flat surface on the light incidence side and a rear surface on the side opposite to the light incidence side, both the front surface and the rear surface on the reflective film being flat surfaces, and the hologram forming layer having a front surface and a rear surface being laminated on the rear surface of the reflective film, the front surface of the hologram forming layer being a flat surface, and the hologram forming part being provided on the rear surface of the hologram forming layer;

said method comprising the steps of:
  irradiating the authenticity identifying film with light including right-handed circularly polarized light and left-handed circularly polarized light; and
  deciding that the authenticity identifying film is authentic when the film has a part that cannot be visually recognized when the authenticity identifying film is observed visually through an examining tool having region that transmits of right-handed circularly polarized light and region transmits left-handed circularly polarized light.

25. A method of using an authenticity identifying film comprising a reflective film comprising a liquid crystal film having a cholesteric phase and having a circularly polarized light selectivity to reflect only either of right-handed circularly polarized light or left-handed circularly polarized light of incident light to produce reflected light, and a hologram forming layer laminated to the reflective firm, having a hologram forming part that reflects circularly polarized light of the opposite circular polarization to that of the reflected light in a direction different from that of the reflected light to form a holographic image, the reflective film comprising a flat surface on the light incidence side and a rear surface on the side opposite to the light incidence side, both the front surface and the rear surface on the reflective film being flat surfaces, and the hologram forming layer having a front surface and a rear surface being laminated on the rear surface of the reflective film, the front surface of the hologram forming layer being a flat surface, and the hologram forming part being provided on the rear surface of the hologram forming layer;

said method comprising the steps of:
  irradiating the authenticity identifying film with light including right-handed circularly polarized light and left-handed circularly polarized light;
  measuring a light intensity difference between intensities of right-handed circularly polarized light and that of left-handed circularly polarized light transmitted by an examining tool having region that transmits of right-handed circularly polarized light and region transmits left-handed circularly polarized light; and
  deciding whether or not the authenticity identifying film is authentic on the basis of the light intensity difference.

* * * * *